(12) United States Patent
Agrawal

(10) Patent No.: US 12,438,876 B2
(45) Date of Patent: Oct. 7, 2025

(54) SYSTEM AND METHOD FOR CONTROLLING DIGITAL CONTENT VIEWERSHIP

(71) Applicant: Sagar Agrawal, New Delhi (IN)

(72) Inventor: Sagar Agrawal, New Delhi (IN)

(*) Notice: Subject to any disclaimer, the term of this patent is extended or adjusted under 35 U.S.C. 154(b) by 233 days.

(21) Appl. No.: 17/667,794

(22) Filed: Feb. 9, 2022

(65) Prior Publication Data

US 2022/0272091 A1    Aug. 25, 2022

Related U.S. Application Data

(60) Provisional application No. 63/151,069, filed on Feb. 19, 2021.

(51) Int. Cl.
*H04L 9/40* (2022.01)
*G06F 1/16* (2006.01)

(52) U.S. Cl.
CPC ............. *H04L 63/10* (2013.01); *G06F 1/163* (2013.01)

(58) Field of Classification Search
CPC ..... H04L 63/10; H04L 63/0428; G06F 1/163; H04W 12/08
USPC .......................................................... 726/4
See application file for complete search history.

(56) References Cited

U.S. PATENT DOCUMENTS

| | | | | |
|---|---|---|---|---|
| 6,317,830 B1* | 11/2001 | Stolz | .................. | H04Q 11/0435 713/168 |
| 10,440,097 B1* | 10/2019 | Raza | .................. | H04L 12/2812 |
| 2002/0077985 A1* | 6/2002 | Kobata | .................. | H04L 63/062 713/189 |
| 2014/0139737 A1* | 5/2014 | Clarke | .................. | H04N 21/00 348/465 |

* cited by examiner

*Primary Examiner* — Tan Doan

(74) *Attorney, Agent, or Firm* — Haukaas Fortius PLLC; Michael Haukaas; Paul K. Judd

(57) ABSTRACT

System and method for controlling digital content viewership is disclosed. The system (100) comprises one or more user devices (108), a subsystem-A (106-A), the subsystem-B (106-B). The one or more user devices (108) comprise unique device identifier, wherein each of the one or more user devices (108) are authenticated and registered by the subsystem-B (106-B) using the unique device identifier. The subsystem-A encodes data, stores data, enables transmission security check, transmission quality check, to transmit the encoded data to the subsystem-B (106-B). Subsystem-B (106-B) is configured to receive and encode the received data from the subsystem-A, where the subsystem-B is configured to encode and transmit each stream specific to each registered device, where the encoded data restricts unauthorized access to the transmitted data.

8 Claims, 6 Drawing Sheets

SYSTEM AND METHOD FOR CONTROLLING DIGITAL CONTENT VIEWERSHIP

RELATED APPLICATIONS

This application claims priority under 35 U.S.C. § 119(e) to U.S. Provisional Application No. 63/151,069 filed on Feb. 19, 2021, which is incorporated herein by reference.

TECHNICAL FIELD

The present invention relates to the field of data streaming, and more particularly the present invention relates to a system and method for controlling digital content viewership.

BACKGROUND

Background description comprises information that may be useful in understanding the present invention. It is not an admission that any of the information provided herein is prior art or relevant to the presently claimed invention, or that any publication specifically or implicitly referenced is prior art.

Consumers are becoming accustomed to near ubiquitous access to Internet-based and web-based services and applications. In the past, data intensive applications, such as steaming video, on-demand video, video conferencing, etc., were limited to devices, such as personal computers, set-top boxes, stand-alone video conferencing systems, etc., having dedicated, high-speed (e.g., broadband) data connections provided by an Internet service provider (ISP). Today, consumers have access to a plethora of electronic devices, including smartphones, tablet computers, personal data devices, personal digital assistants, etc., that support Internet connectivity, and may have sufficient processing power to support at least some media-rich applications.

Currently, the scenario of regular streaming of data on any device is not able to restrict, check or control the number of users of said data. When the number of users that have access to the data are restricted, checked or controlled it becomes inconvenient to the user(s).

There is, therefore, a need to overcome the above drawback and provide an efficient, secure and reliable system and method for controlling digital content viewership, during data streaming. Further, there is also a need to reduce the complexity and cost involved in managing device-specific keys

SUMMARY

The present invention relates to the field of data streaming, and more particularly the present invention relates to a system and method for controlling digital content viewership.

Embodiments herein, invention an object of the present invention provides a simple, secure, and efficient system and method for controlling digital content viewership. Another, object of the present invention provides a simple, secure, and efficient system and method for streaming data seamlessly to user devices such as IoT devices, infotainment devices, gaming devices, and the likes. Another, object of the present invention efficiently, economically, and securely manages the authentication of the user devices, and multi layered encoding of the data. Another, object of the present invention restricts unauthorized access to the transmitted data.

In an aspect of the present invention discloses system for controlling digital content viewership comprising one or more user devices, a subsystem-A, a subsystem-B, and other subsystem-N. The one or more user devices comprising unique device identifier, where the each of the one or more user devices are authenticated and registered by using the unique device identifier, where the each one or more user devices are registered user device. The subsystem-A can be communicatively coupled to a subsystem-B, other subsystem-N, and the one or more user devices. The subsystem-A can be configured to authenticate and register the one or more user devices using the unique device identifier to encode data, store data, enable transmission security check, transmission quality check, and to transmit the encoded data to the subsystem-B. The subsystem-B can be communicatively coupled to the one or more user devices, where the subsystem-B can be configured to receive and encode the received data from the subsystem-A. The subsystem-B can be configured to encoding and transmitting each stream specific to each registered device, where the encoded data restricts unauthorized access to the transmitted data.

In another aspect of the present invention pertains to method for controlling digital content viewership can comprises authenticating and registering one or more user devices by a subsystem-A using unique device identifier, where the each one or more user devices are registered device. Further, the subsystem-A can receive and encode data by enabling transmission security check, transmission quality check, such that the encoded data is transmitted to the subsystem-B. The subsystem-B can perform streaming and transmitting of the encoded data, to each registered device, where the encoded data restricts unauthorized access to the transmitted data.

In another aspect of the present invention pertains to a system and method, the registered device can comprises unique device identifier selected from a group comprising device id, device type, device location, IP address, IMEI number and a combination thereof. The registered device can comprise includes unique electronic signature/fingerprint configuration.

In an aspect of the present invention pertains to a system and method, the one or more user devices can include non-wearable device(s) and wearable device(s), where the non-wearable device(s) and the wearable device(s) can be configured to ensure authorized usage check and transmission security check performed by the subsystem-A.

In an aspect of the present invention pertains to a system and method, the encoded data can be seamlessly decoded and streamed to the non-wearable device(s) and the user wearable device(s) based on occurrence of a data synchronization and passing of the transmission security check with permitted usage of data.

In an aspect of the present invention pertains to a system and method, the subsystem-A can be configured to perform a multi layered encoding to detect unauthorized usage of data, where separate and specific encoding can be performed on the one or more user devices and one or more transmissions by allocating an unique encoding identifier, where the one or more user devices and one or more transmissions can be traced along with location through which data is unauthorized used.

In an aspect of the present invention pertains to a system and method, the subsystem-A can be configured to interrupt the transmission of encoded data based on faults detected in the security of transmission of encoded data.

Various objects, features, aspects and advantages of the inventive subject matter will become more apparent from the following detailed description of preferred embodiments, along with the accompanying drawing figures in which like numerals represent like components.

BRIEF DESCRIPTION OF DRAWINGS

The accompanying drawings are comprised to provide a further understanding of the present invention, and are incorporated in and constitute a part of this specification. The drawings illustrate exemplary embodiments of the present invention and, together with the description, serve to explain the principles of the present invention. The diagrams are for illustration only, which thus is not a limitation of the present invention.

In the figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
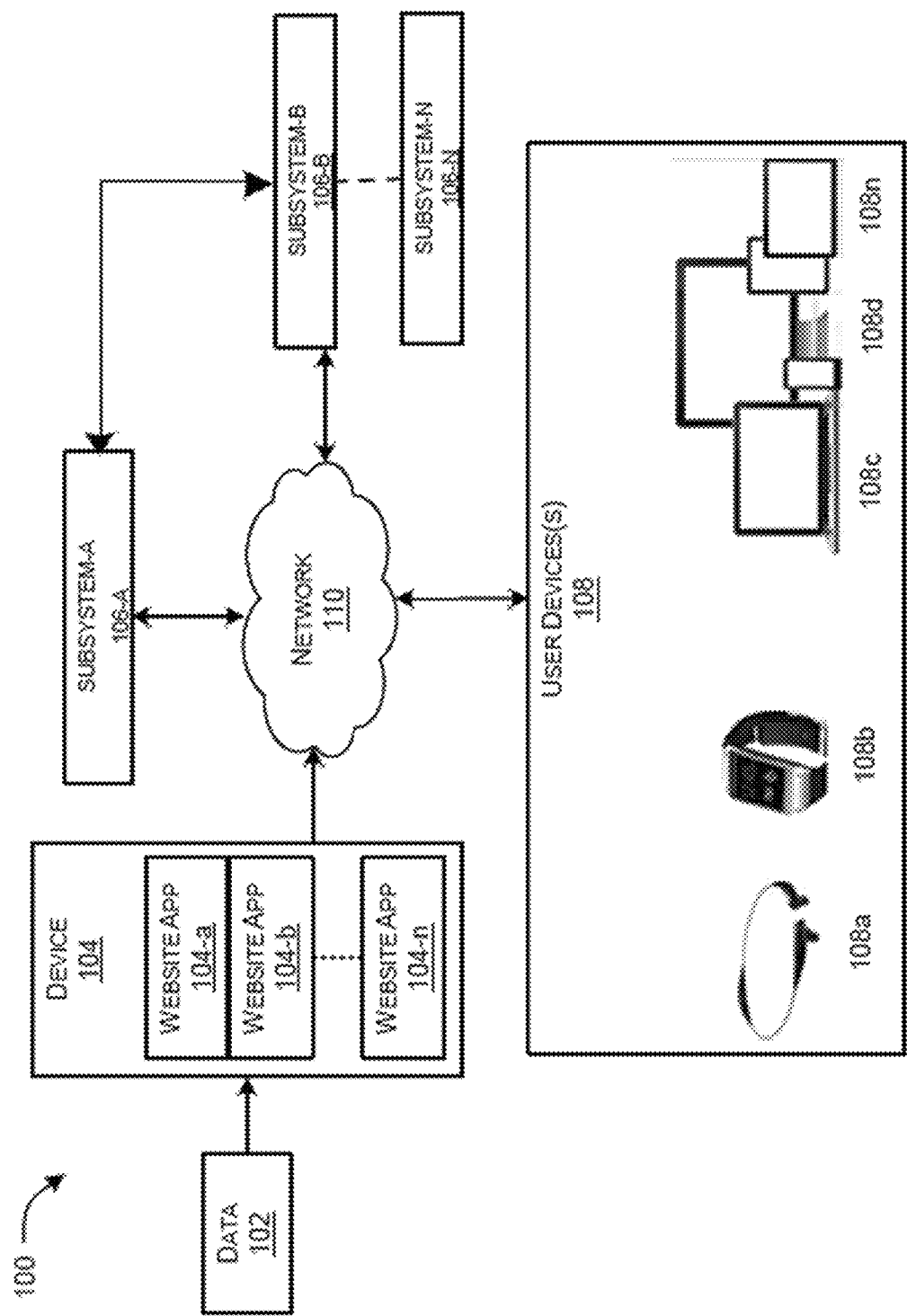
FIG. 1A and FIG. 1B illustrate exemplary network architecture of the proposed system for controlling digital content viewership, in accordance with an embodiment of the present invention.

The following is a detailed description of embodiments of the invention depicted in the accompanying drawings. The embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims.

In the following description, numerous specific details are set forth in order to provide a thorough understanding of embodiments of the present invention. It will be apparent to one skilled in the art that embodiments of the present invention may be practiced without some of these specific details.

The present invention relates to the field of data streaming, and more particularly the present invention relates to a system and method for controlling digital content viewership.

Embodiment herein of the present invention pertains to system for controlling digital content viewership comprising one or more user devices, a subsystem-A, a subsystem-B, and other subsystem-N. The one or more user devices comprising unique device identifier, where the each of the one or more user devices are authenticated and registered by using the unique device identifier, where the each one or more user devices are registered user device. The subsystem-A can be communicatively coupled to a subsystem-B, other subsystem-N, and the one or more user devices. The subsystem-A can be configured to authenticate and register the one or more user devices using the unique device identifier to encode data, store data, enable transmission security check, transmission quality check, and to transmit the encoded data to the subsystem-B. The subsystem-B can be communicatively coupled to the one or more user devices, where the subsystem-B can be configured to receive and encode the received data from the subsystem-A. The subsystem-B can be configured to encoding and transmitting each stream specific to each registered device, where the encoded data restricts unauthorized access to the transmitted data.

In an embodiment of the present invention pertains to method for controlling digital content viewership can comprises authenticating and registering one or more user devices by a subsystem-A using unique device identifier, where the each one or more user devices are registered device. Further, the subsystem-A can receive and encode data by enabling transmission security check, transmission quality check, such that the encoded data is transmitted to the subsystem-B. The subsystem-B can perform streaming and transmitting of the encoded data, to each registered device, where the encoded data restricts unauthorized access to the transmitted data.

In exemplary embodiment, the registered device can comprises unique device identifier selected from a group comprising device id, device type, device location, IP address, IMEI number and a combination thereof.

In exemplary embodiment, the one or more user devices can include non-wearable device(s) and wearable device(s), where the non-wearable device(s) and the wearable device(s) can be configured to ensure authorized usage check and transmission security check performed by the subsystem-A.

In exemplary embodiment, the encoded data can be seamlessly decoded and streamed to the non-wearable device(s) and the user wearable device(s) based on occurrence of a data synchronization and passing of the transmission security check with permitted usage of data.

In exemplary embodiment, the subsystem-A can be configured to perform a multi layered encoding to detect unauthorized usage of data, where separate and specific encoding can be performed on the one or more user devices and one or more transmissions by allocating an unique encoding identifier, where the one or more user devices and one or more transmissions can be traced along with location through which data is unauthorized used.

In exemplary embodiment, the subsystem-A can be configured to interrupt the transmission of encoded data based on faults detected in the security of transmission of encoded data.

Figure 1B:
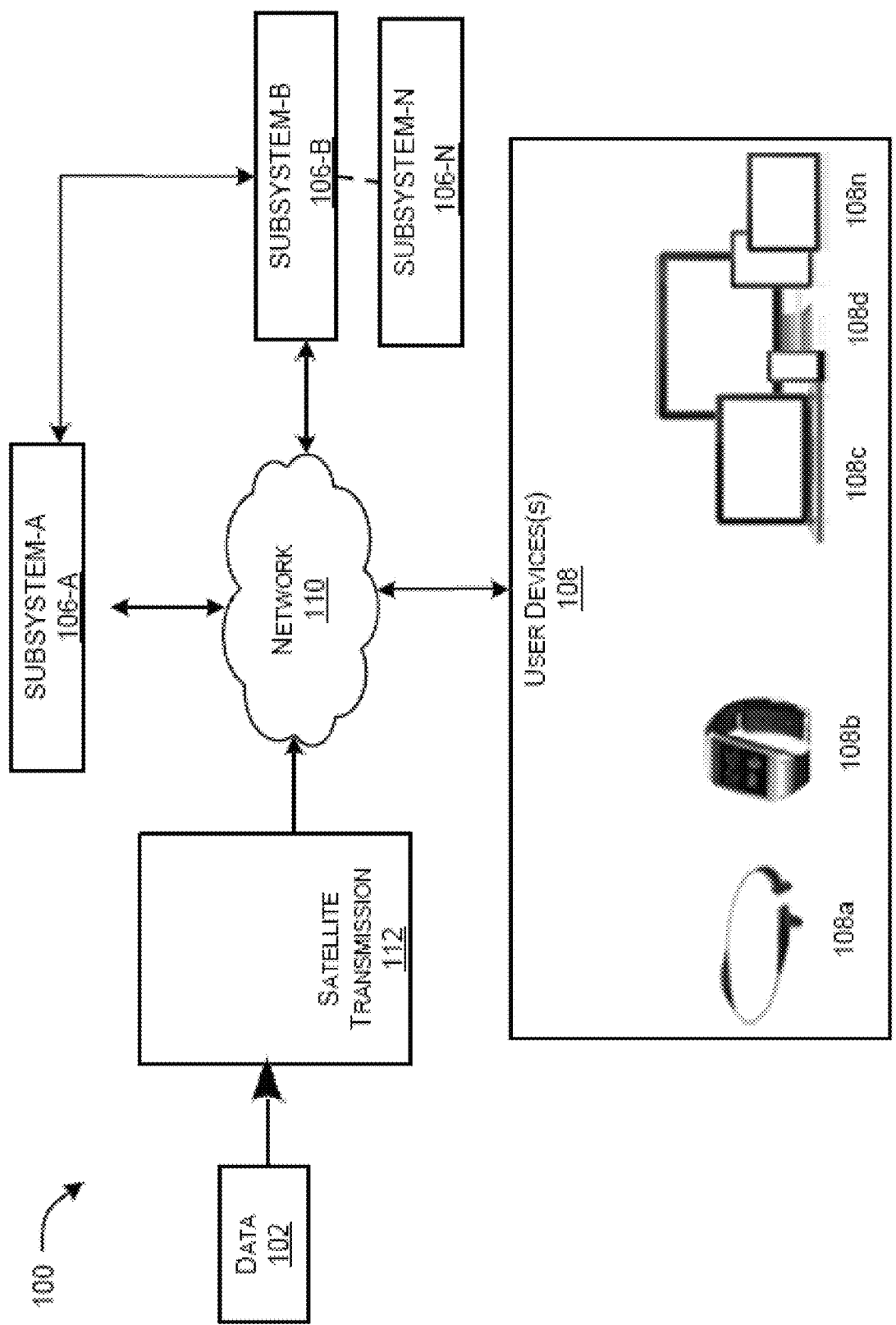
Figure 2:
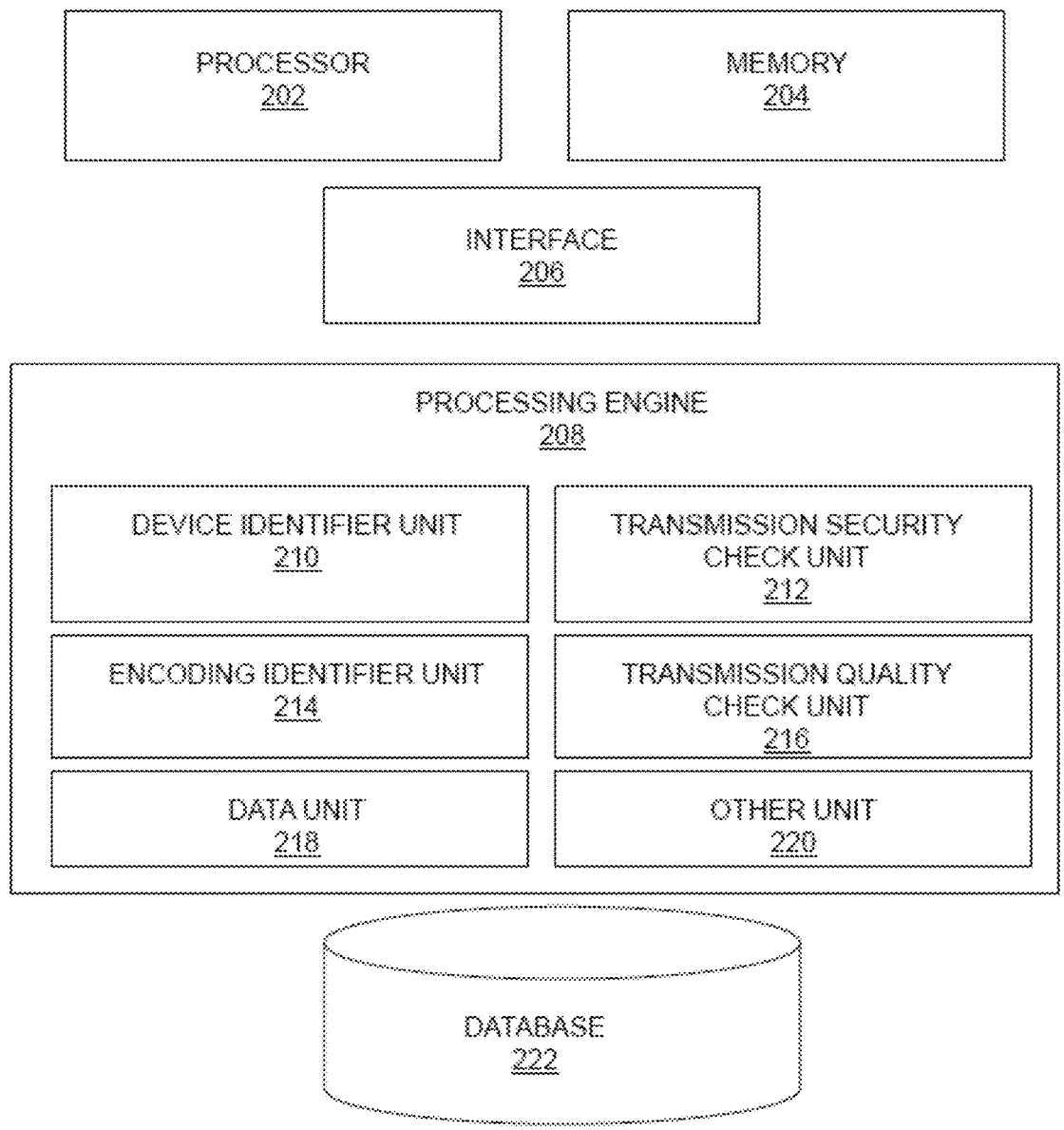
FIG. 2 illustrates an exemplary architecture of the proposed system for controlling digital content viewership, in accordance with an embodiment of the present invention.

In an exemplary embodiment, referring to FIGS. 1 and 2, the proposed system 100 for controlling digital content viewership comprises one or more user devices 108-1 to 108-N (collectively referred to as devices 108, herein), data 102, a device 104 includes multiple website applications 104-*a* to 104-*n*, a subsystem-A 106-A, a subsystem-B 106-B, a subsystem-N, a network 110. The one or more user devices 108-1 to 108-N includes non-wearable device(s) and wearable device(s), where the non-wearable device(s) can be selected from a group comprising smart phones, laptops, Amazon echo show, palmtop and the like. Further, the wearable device(s) can be selected from a group comprising Bluetooth earphones, air pods, smart watches, head-mounted displays, smart home devices, and the like (also designated as 108, herein). The system 100 includes the network 110 which is configured to establish communication between the device 104, the subsystem-A 106-A, the subsystem-B 106-B, and the one or more user devices.

In an exemplary embodiment, the one or more user devices 108 comprising unique device identifiers, where each of the one or more user devices are authenticated and registered by using the unique device identifier. The registered device comprises unique device identifier selected from a group comprising device id, device type, device location, IP address, IMEI number and the like. Thus, the each one or more user devices are known as registered user device. The one or more user devices can include unique electronic signature/fingerprint configuration.

In another exemplary embodiment, the system can include either the device 104 or a satellite 112 (FIG. 1B). The devices 104 are selected from IoT devices, infotainment devices, gaming devices, and the likes. The devices 104 includes multiple website applications 104-a to 104-n comprising but not limited to, YouTube, Netflix, Amazon prime, Discovery Plus. The satellite 202 is also known as communications satellite, which is an artificial satellite that relays and amplifies radio telecommunication signals. The satellite 202 creates a communication channel between a source transmitter and a receiver at different locations on Earth. The satellite 202 comprising but not limited to television, telephone, radio, internet, military applications.

In an exemplary embodiment, the proposed system 100 is implemented using any or a combination of hardware components and software components such as a cloud, a server, a computing system, a computing device, a network device, and the like. Further, devices 104 interact with the subsystem-A, through an application or software 104-a . . . 104-n that resides in the devices 104. In an implementation, the system 100 is accessed by an application that is configured with any operating system, comprising but not limited to, Android™, iOS™, Windows, and the like. It will be understood that the system is implemented as any suitable computing system known in the art, such as a desktop, a laptop, a server, web server, and the like.

In an exemplary embodiment, the network 110 is a wireless network, a wired network or a combination thereof that is implemented as one of the different types of networks, such as Intranet, Local Area Network (LAN), Wide Area Network (WAN), Internet, and the like. Further, the network is either a dedicated network or a shared network. The shared network represents an association of the different types of networks that uses a variety of protocols, for example, Hypertext Transfer Protocol (HTTP), Transmission Control Protocol/Internet Protocol (TCP/IP), Wireless Application Protocol (WAP), and the like.

In an exemplary embodiment, the non-wearable device(s) and the wearable device(s) 108 of the system 100 are configured to ensure authorized usage check and transmission security check performed by the subsystem-A 106-A, where the subsystem-A is configured to authenticate and register the one or more user devices 108 using the unique device identifier to encode data, store data, enable transmission security check, transmission quality check, and to transmit the encoded data to the subsystem-B.

In another exemplary embodiment, the subsystem-B is configured to receive and encode the received data from the subsystem-A 106-A, where the subsystem-B 106-B is configured to encode and transmit each stream specific to each registered device 108, wherein the encoded data restricts unauthorized access to the transmitted data. The encoded data can include audio data, video data, and the likes.

In an exemplary embodiment, the one or more user devices 108 are configured to ensure authorized usage check and transmission security check performed by the subsystem-A, where the encoded data is seamlessly decoded and streamed to the non-wearable device(s) and the user wearable device(s) 108 based on occurrence of a data synchronization and passing of the transmission security check with permitted usage of data.

In an exemplary embodiment, the subsystem-A 106-A is configured to perform a multi layered encoding to detect unauthorized usage of data. The subsystem-A is configured to encode separate and specific the one or more user devices 108 and one or more transmissions by allocating an unique encoding identifier. The one or more user devices 108 and one or more transmissions can be traced along with location through which data is unauthorized used. Further, the subsystem-A is configured to interrupt the transmission of encoded data based on faults detected in the security of transmission of encoded data.

In another exemplary embodiment, the subsystem-A 106-A includes a feedback loop (not shown in figure). The feedback loop is incorporated in the subsystem-A 106-A in order to monitor the changes occurring in the system 100. For instance, when the subsystem-A 106-A provides encoded data to a user(s) via the one or more user devices, then the feedback loop is configured to monitor and receive the activities performed by the user(s) by using the one or more user devices of the subsystem-A 106-A. Finally, the feedback loop updates the subsystem-A 106-A regarding the status of the particular encoded data which has been accessed by the one or more user devices. The feedback loop of the subsystem-A 106-A plays a prominent role in the system 100 by updating the status of every transmission to the subsystem-A 106-A which has been conducted.

FIG. 2 illustrates an exemplary architecture 200 of the proposed system 100 for controlling digital content viewership, in accordance with an embodiment of the present invention.

An exemplary embodiment herein, illustrated in FIG. 2, an architecture 200 of the proposed system 100. The system architecture 200 comprises one or more processor(s) 202. The one or more processor(s) 202 are implemented as one or more microprocessors, microcomputers, microcontrollers, digital signal processors, central processing units, logic circuitries, and/or any devices that manipulate data based on operational instructions. Among other capabilities, one or more processor(s) 202 are configured to fetch and execute computer-readable instructions stored in a memory of the computing unit. The memory 204 stores one or more computer-readable instructions or routines, which are fetched and executed to create or share the data units over a network service. Memory 204 comprises any non-transitory storage device comprising, for example, volatile memory such as RAM, or non-volatile memory such as EPROM, flash memory, and the like.

In an exemplary embodiment, the system 100 also comprises an interface(s) 206. The interface(s) 206 comprises a variety of interfaces, for example, interfaces for data input and output devices referred to as I/O devices, storage devices, and the like. The interface(s) 206 facilitates communication of the second computing unit 106 with various devices coupled to the second computing unit 106. The interface(s) 206 also provides a communication pathway for one or more components of the second computing unit. Examples of such components comprise, but are not limited to, processing engine(s) 208 and database 216. The Interface 206 comprises a platform for communication with the devices to read real-time data/write data or certificates in the second computing unit, and to communicate with the OEM backend. The interfaces 206 comprise Graphical interface that allows user to feed inputs, to type/write/upload the data and certificates, and other software and hardware interfaces, for example, interfaces 206 for peripheral device(s), such as a keyboard, a mouse, an external memory, and a printer.

In an exemplary embodiment, the processing engine(s) 208 are implemented as a combination of hardware and programming (for example, programmable instructions) to implement one or more functionalities of the processing engine(s) 208. In the examples described herein, such combinations of hardware and programming may be implemented in several different ways. For example, the programming for the processing engine(s) 208 are processor-executable instructions stored on a non-transitory machine-readable storage medium, and the hardware for the processing engine(s) 208 comprises a processing resource (for example, one or more processors), to execute such instructions. In the present examples, the machine-readable storage medium stores instructions that, when executed by the processing resource, implement the processing engine(s) 208. In such examples, the second computing unit 106 comprises the machine-readable storage medium storing the instructions and the processing resource to execute the instructions, or the machine-readable storage medium may be separate but accessible to the computing unit and the processing resource. In other examples, the processing engine(s) 208 is implemented by electronic circuitry. Database 222 comprises data that is either stored or generated as a result of functionalities implemented by any of the components of the processing engine(s).

In an exemplary embodiment, the processing engine(s) 208 comprises a device identifier unit 210, a transmission security check unit 212, an encoding identifier unit 214, a transmission quality check unit 216, a data unit 218, and other units (s) 220, but not limited to the likes. The other unit(s) 220 implements functionalities that supplement applications or functions performed by the system 100 or the processing engine(s) 208. The data (or database 222) serves, amongst other things, as a repository for storing data processed, received, and generated by one or more of the units.

Figure 3:
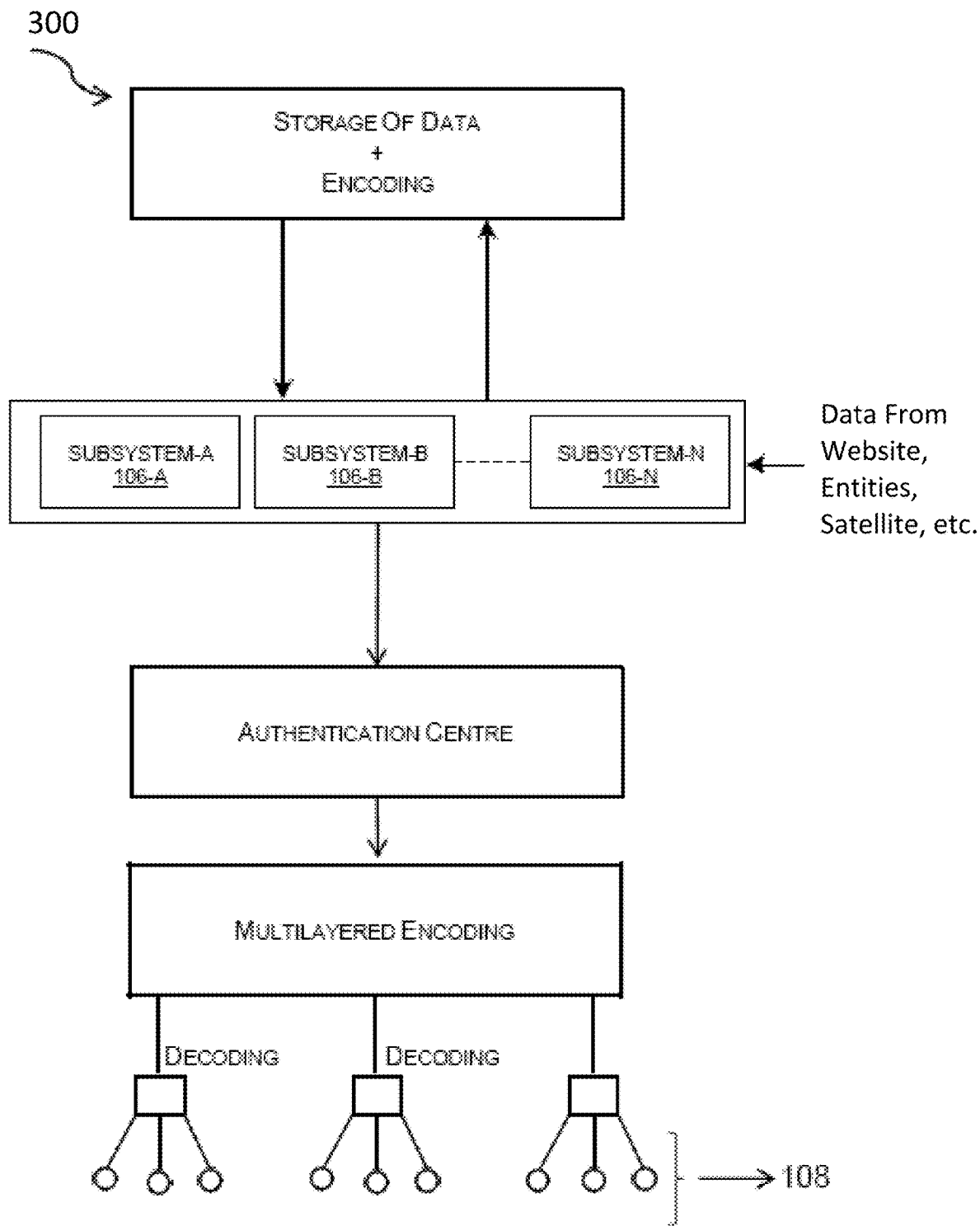
FIG. 3 illustrates an exemplary block diagram 300 implementing the mechanism for controlling digital content viewership, in accordance with an embodiment of the present invention.

FIG. 3 illustrates an exemplary block diagram 300 implementing the mechanism for controlling digital content viewership, in accordance with an embodiment of the present invention.

In an exemplary embodiment, the block diagram 300 includes various essential components of the present invention such as a subsystem-A 106-A, one or more user devices 108. When the subsystem-A 106-A receives data either from websites or entities or satellite, the subsystem-A 106-A performs encoding on the received data and stores the data. Further, the subsystem-A 106-A is configured to authenticate the encoded data and perform the multilayered encoding data, where each and every transmission is encoded. Furthermore, the data is decoded and transmitted to the one or more user device 108.

Figure 4:
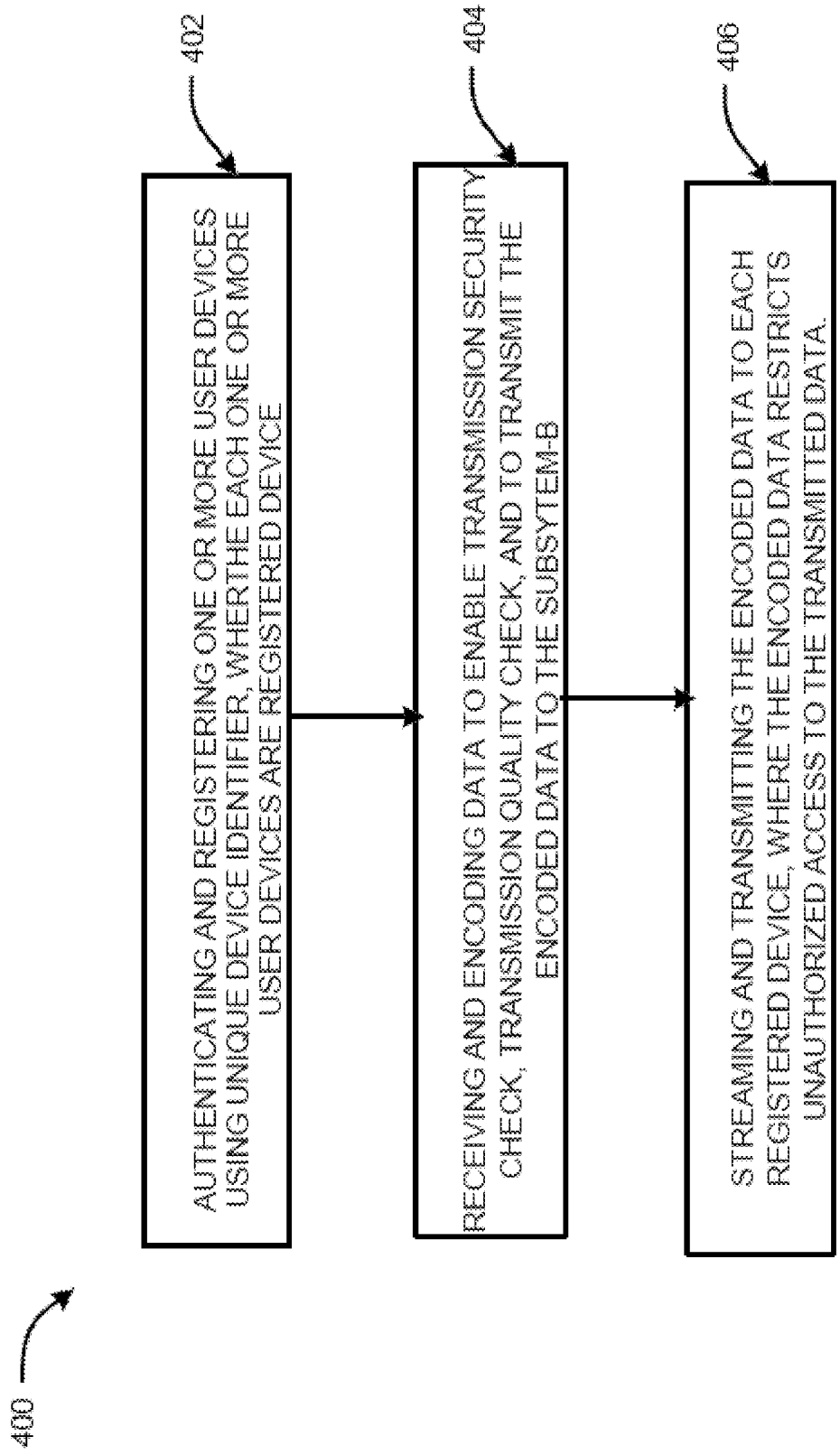
FIG. 4 illustrates an exemplary flow diagram of steps involved in the proposed method for controlling digital content viewership, in accordance with an embodiment of the present invention.

FIG. 4 illustrates an exemplary flow diagram of steps involved in the proposed method 400 for controlling digital content viewership, in accordance with an embodiment of the present invention.

In an exemplary embodiment, at block 402, one or more user devices 108 are authenticated and registered by the subsystem-A 106-A using unique device identifier, where the each one or more user devices 108 are registered device. At block 404, the subsystem-A 106-A can be configured to receive and encode data, by enabling transmission security check, transmission quality check. The subsystem-A 106-A transmits the encoded data to the subsystem-B. At block 406, the subsystem-B streams and transmits the encoded data to each registered device, where the encoded data restricts unauthorized access to the transmitted data.

Figure 5:
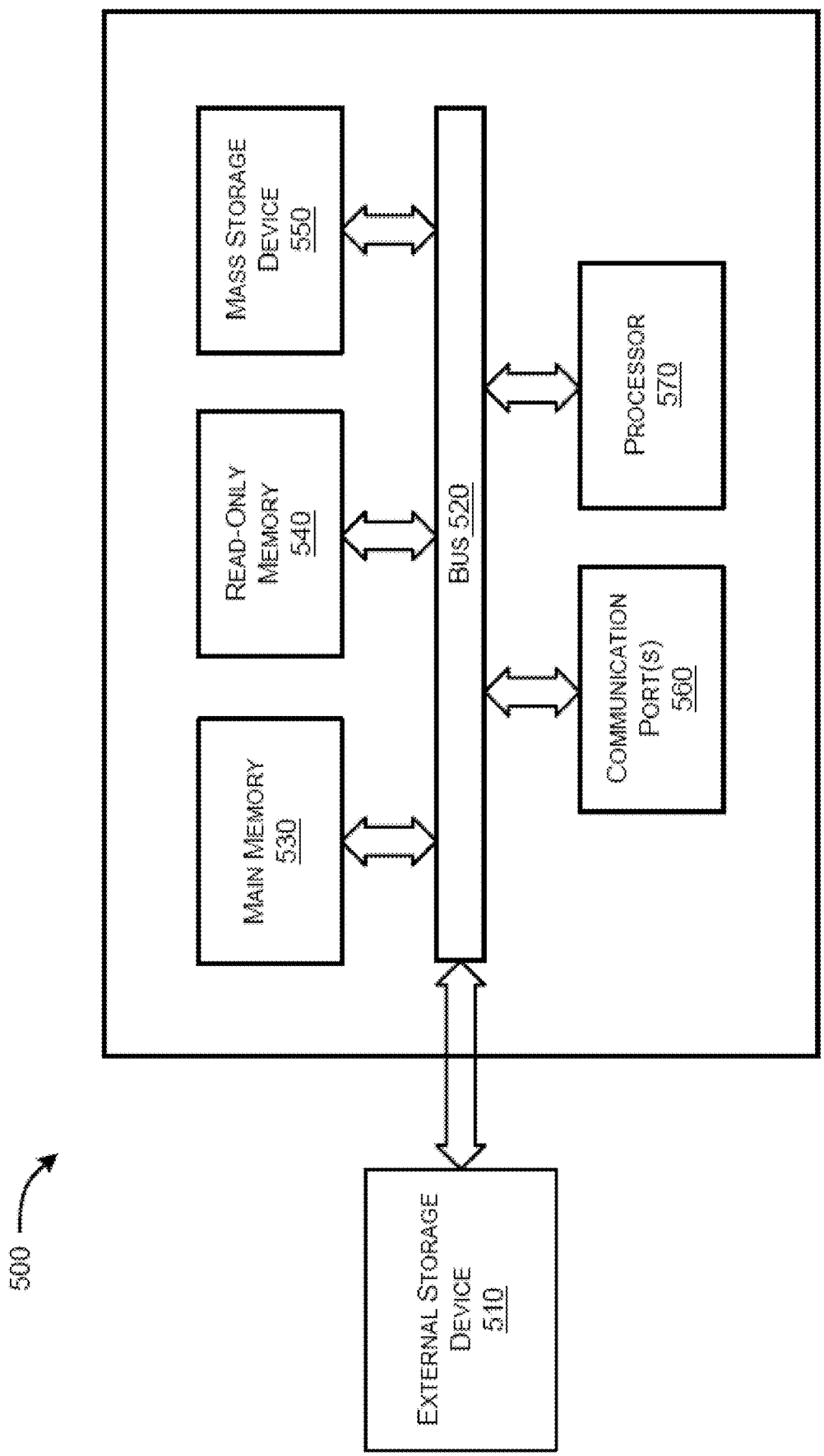
FIG. 5 illustrates an exemplary computer system in which or with which embodiments of the present invention can be utilized in accordance with embodiments of the present invention.

FIG. 5 illustrates an exemplary computer system in which or with which embodiments of the present invention can be utilized in accordance with embodiments of the present invention.

In an exemplary embodiment, referring to FIG. 5, computer system includes an external storage device 510, a bus 520, a main memory 530, a read only memory 540, a mass storage device 550, communication port 560, and a processor 570. A person skilled in the art will appreciate that computer system may include more than one processor and communication ports. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention. Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 660 may be chosen depending on a network, such a Local Area Network (LAN), Wide Area Network (WAN), or any network to which computer system connects.

In an exemplary embodiment, the memory 530 can be Random Access Memory (RAM), or any other dynamic storage device commonly known in the art. Read only memory 640 can be any static storage device(s) e.g., but not limited to, a Programmable Read Only Memory (PROM) chips for storing static information e.g., start-up or BIOS instructions for processor 670. Mass storage 560 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7102 family) or Hitachi (e.g., the Hitachi Deskstar 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc.

In an exemplary embodiment, the bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

In another exemplary embodiment, operator and administrative interfaces, e.g. a display, keyboard, and a cursor control device, may also be coupled to bus 520 to support direct operator interaction with computer system. Other operator and administrative interfaces can be provided through network connections connected through communication port 660. External storage device 510 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM). Components described above are meant only to exemplify various possibilities. In no way should the aforementioned exemplary computer system limit the scope of the present invention.

If the specification states a component or feature "may", "can", "could", or "might" be included or have a characteristic, that particular component or feature is not required to be included or have the characteristic.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Moreover, in interpreting the specification, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refer to at least one of something selected from the group consisting of A, B, C . . . and N, the text should be interpreted as requiring only one element from the group, not A plus N, or B plus N, etc.

While the foregoing describes various embodiments of the invention, other and further embodiments of the invention may be devised without departing from the basic scope thereof. The scope of the invention is determined by the claims that follow. The invention is not limited to the described embodiments, versions or examples, which are comprised to enable a person having ordinary skill in the art to make and use the invention when combined with information and knowledge available to the person having ordinary skill in the art.

Advantages of the Invention

The proposed invention provides a simple, secure, and efficient system and method for controlling digital content viewership.

The proposed invention provides a simple, secure, and efficient system and method for streaming data seamlessly to user devices such as IoT devices, infotainment devices, gaming devices, and the likes.

The proposed invention efficiently, economically, and securely manages the authentication of the user devices, and multi layered encoding of the data.

The proposed invention restricts unauthorized access to the transmitted data.

What is claimed is:

1. A method for controlling digital content viewership comprises:
   authenticating and registering one or more user devices, by a subsystem-A, using unique device identifier, wherein each of the one or more user devices is a registered device;
   receiving and encoding data, by the subsystem-A, to enable transmission security check, transmission quality check, and to transmit the encoded data to a subsystem-B, wherein the subsystem-A is configured to interrupt the transmission of the encoded data based on faults detected in the security of the transmission of the encoded data, wherein a multi layered encoding is performed to detect unauthorized usage of the data, wherein separate and specific encoding is performed on the one or more user devices and one or more transmissions by allocating a unique encoding identifier, and wherein the one or more user devices and the one or more transmissions are traced along with location to detect the unauthorized usage of the data; and
   streaming and transmitting the encoded data, by the subsystem-B, to each registered device, wherein the encoded data restricts unauthorized access to the transmitted data.

2. The method as claimed in claim 1, wherein the registered device comprises unique device identifier selected from a group comprising device id, device type, device location, IP address, IMEI number and a combination thereof.

3. The method as claimed in claim 1, wherein the one or more user devices includes non-wearable device(s) and wearable device(s), wherein the non-wearable device(s) and the wearable device(s) are configured to ensure authorized usage check and transmission security check performed by the subsystem-A.

4. The method as claimed in claim 3, wherein the encoded data is decoded and streamed to the non-wearable device(s) and the wearable device(s) based on occurrence of a data synchronization and passing of the transmission security check with permitted usage of data.

5. A system for controlling digital content viewership comprises:
   one or more user devices comprising unique device identifier, wherein each of the one or more user devices are authenticated and registered by using the unique device identifier, wherein each of the one or more user devices is a registered user device;
   a subsystem-A communicatively coupled to a subsystem-B, other subsystem-N, and the one or more user devices via a network, wherein the subsystem-A is configured to authenticate and register the one or more user devices using the unique device identifier to encode data, store data, enable transmission security check, enable transmission quality check, and to transmit the encoded data to the subsystem-B, wherein the subsystem-A is configured to interrupt the transmission of the encoded data based on faults detected in the security of the transmission of the encoded data, wherein the subsystem-A is configured to perform a multi-layered encoding to detect unauthorized usage of the data, wherein separate and specific encoding is performed on the one or more user devices and one or more transmissions of the encoded data by allocating a unique encoding identifier, and wherein the one or more user devices and the one or more transmissions are traced along with location to detect the unauthorized usage of the data; and
   the subsystem-B is communicatively coupled to the one or more user devices via the network, wherein the subsystem-B is configured to receive and encode the received data from the subsystem-A, wherein the subsystem-B is configured to encode and transmit each stream specific to each registered device, and wherein the encoded data restricts unauthorized access to the transmitted data.

6. The system as claimed in claim 5, wherein the registered device comprises unique device identifier selected from a group comprising device id, device type, device location, IP address, IMEI number and a combination thereof.

7. The system as claimed in claim 5, wherein the one or more user devices includes nonwearable device(s) and wearable device(s), wherein the non-wearable device(s) and the wearable device(s) are configured to ensure authorized usage check and transmission security check performed by the subsystem-A.

8. The system as claimed in claim 7, wherein the encoded data is decoded and streamed to the non-wearable device(s) and the wearable device(s) based on occurrence of a data synchronization and passing of the transmission security check with permitted usage of data.

* * * * *